July 2, 1968  L. C. TURNER  3,390,679
BEAK TRIMMING DEVICE
Filed Feb. 11, 1966  2 Sheets-Sheet 1

Leon C. Turner
INVENTOR.

BY *Wm R. Price*
ATTORNEY

LEON C. TURNER
INVENTOR.

United States Patent Office 3,390,679
Patented July 2, 1968

3,390,679
BEAK TRIMMING DEVICE
Leon C. Turner, R.R. 1, Burkesville, Ky. 42717
Filed Feb. 11, 1966, Ser. No. 526,917
10 Claims. (Cl. 128—303.1)

This invention relates to a mechanism for trimming the beaks of fowl and has as an object the provision of a mechanism whereby poultry beaks can be quickly and easily trimmed. More specifically, this invention relates to a method and means of trimming and cauterizing the beak of a bird whereby both lower and upper beaks are trimmed simultaneously. Still more specifically, this invention relates to a method and means whereby the upper and lower beak of a bird may be trimmed without injury to the tongue of the bird. Another purpose of this invention is the provision of means whereby both the upper and lower beak of the fowl may be trimmed at an advantageous angle.

As is well known, a problem prevalent in the raising of poultry is the tendency of the birds to attack each other in a form of cannibalism so that if blood is drawn, the bird is persistently pecked by the others until he is injured or killed. It has long been the practice to trim with a sharp object the upper bill of small chicks; however, it has been found that within a short time the beaks retain their growth and pecking is again renewed. It has been found further, that with pullets of a particular age that if the beak is trimmed and cauterized at the proper point, the growth buds of the beak are killed, so that the beak does not attain its full growth. This effectively minimizes cannibalism among the debeaked chickens. The problem has increased in prevalence due to the fact that the prevailing practice is to maintain several chickens in a confined area. So long as the chickens were free to roam, cannibalism was not a particular problem, except at the moulting stage. However, when the chickens are maintained in close confinement, as is today's practice, cannibalism and pecking have increased greatly. Accordingly, debeaking has become a common practice among poultry raisers. However, to date it has been the practice to trim only the upper beak since trimming of the lower beak required an extra operation. Further, in many instances, if the bird were trimmed as a chick, the lower beak had not regained its full growth. However, in trimming the upper beak, it sometimes happens that the beak is cut too short, leaving a protruding underbeak which hinders the bird in its feeding. Accordingly, it then became necessary to trim the lower beak which is somewhat awkward with existing equipment.

It is an object of this invention, therefore, to provide a method and means whereby the upper and lower beaks can be trimmed simultaneously without injury to the tongue.

Still another object of this invention is a method and means whereby the bird's tongue is protected from injury during the trimming operation.

Still another object of this invention is a method and means whereby the bird's beak may be cut at the most advantageous angle to stop future growth so as to minimize pecking without deleteriously affecting the bird's eating habits.

The invention will be better understood by attention to the attached drawings in which.

Figure 1:
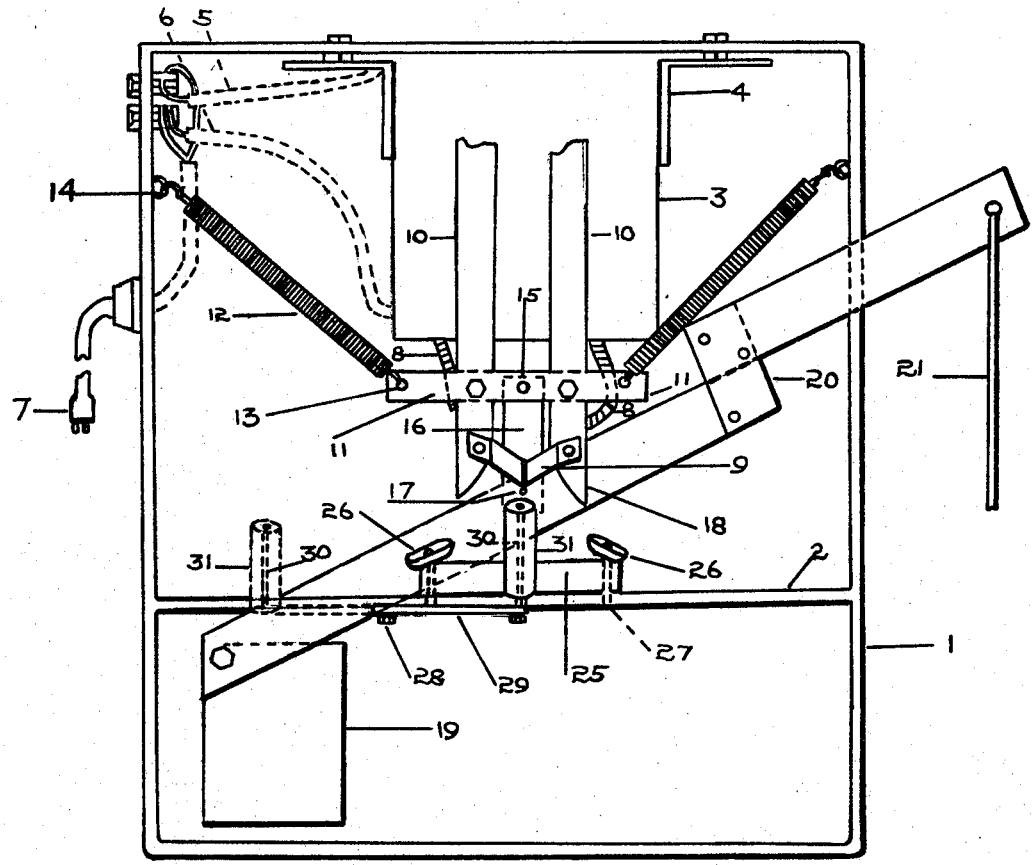
FIG. 1 is a front elevation of a beak cauterizer embodying my invention.

With continuing reference to the attached drawings, the beak trimming mechanism illustrated in FIG. 1 is similar in construction to the commercial Lyon beak trimmer which is described in detail in his Patent No. 2,359,569. This mechanism consists of housing 1 containing a transverse bar 2. Suspended from the top of housing 1 by L-shaped brackets 4 is electrical coil 3 which is interconnected through leads 5 and 6 to an electrical plug 7. Leading from the electric coil 3 is a lead 8 which connects with blade 9 which may be fabricated of a highly resistant alloy such as Inconel. The blade 9 is connected to vertical support guides 10 which contains a crossbar 11. Connected to the crosspiece 11 through eye 13 and eye 14 on the housing are springs 12 which hold the complete assembly in upright position. The cauterizing assembly is pulled downwardly by means of a draw link 16 pivoted by pin 15 in crosspiece 11. The draw link 16 is attached at its lower extremity through pin 17 to lever 18 which has as its fulcrum, bracket 19. The lever 18 extends through the wall of the housing 1, having an upper offset at 20 and is connected to an operating link 21 which may be connected to a foot pedal or hand lever for drawing the whole assembly downwardly against the biasing pressure of springs 12. Supported on transverse bar 2 is an anvil 25 which may be water cooled. Anvil 25 has connected thereto pivotal guides 26 which are pivoted on pins 27. Laterally disposed therefrom is pin 28 on which link 29 is pivotably connected to transverse bar 2. The link 29 contains at its terminal end a vertical standard 30 over which a cylindrical tongue depressor 31 is fitted. The tongue depressor is preferably fabricated of resilient material such as polyurethane foam, foam rubber or the like.

In operation, the blade is held out of engagement with the anvil through means of springs 12 biased against crosspiece 11. Thus, when it is desired to cauterize the bird's beak, the electrical plug is connected to heat through resistance the blade 9 to cauterizing temperature. Thereafter, the bird's head is turned 90° so as to approach the debeaking device sideways. The bird's mouth is opened and placed over the tongue depressor 31 and the beak thereafter is squeezed partially shut and fixed onto the cool anvil 25 utilizing the beak guides 26. Thereafter, by operation of the foot pedal not shown, or hand lever, not shown link 21 is brought down forcibly so as to force the lever 18 downwardly thus pulling through means of draw link 16 the entire cauterizing assembly into contact with the bird's beak and ultimately with the water cooled anvil. As is illustrated, in FIG. 5, the blade 9 of this device, in a preferred embodiment is in a V-shape so that the apex of the V defines an angle of about 45 degrees. This allows the beak to be cut tangentially so that the upper beak is cut from the upper surface rearwardly and downwardly and the lower beak is cut from the lower surface rearwardly and upwardly. I have found that this tangential cut of the beak is preferable. It will also be noted that the tongue depressor 31 holds the tongue of the fowl back in the mouth well out of the way of the blade 9 so that both lower and upper beaks can be trimmed simultaneously without injury to the bird's tongue.

Figure 4:
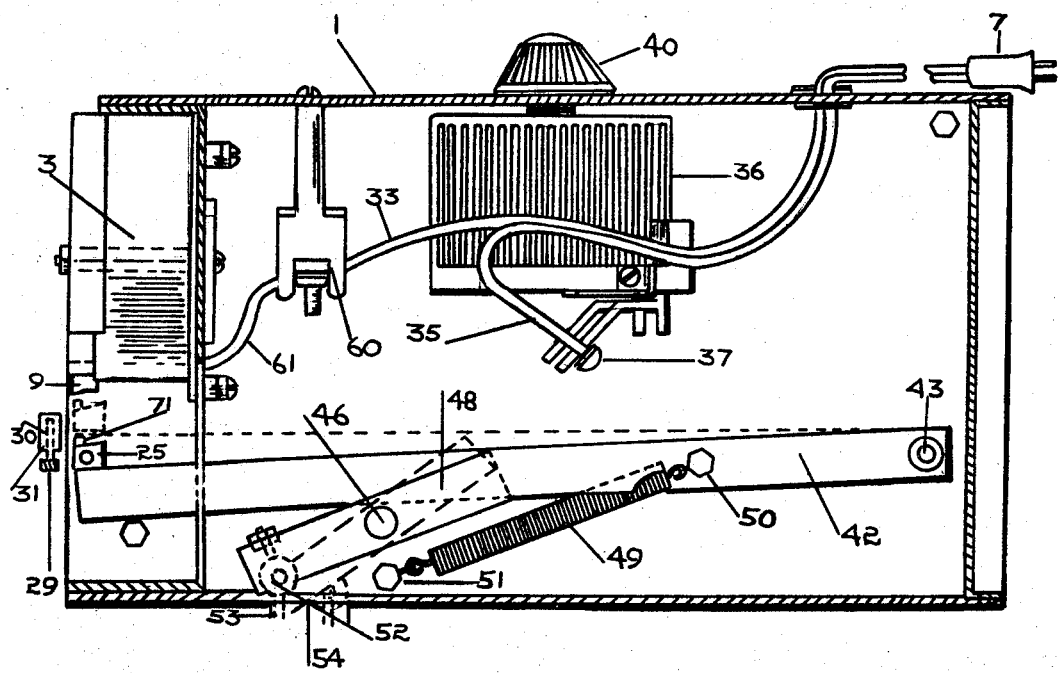
FIG. 4 is a longitudinal sectional view of another beak trimming mechanism wherein the support and anvil reciprocate to meet the blade.

I have shown in FIG. 1 a machine wherein the blade is reciprocated in and out of contact with the anvil 25. However, it is possible to reciprocate the anvil in and out of contact with the blade and such mechanism is illustrated in FIG. 4. This mechanism is similar in construction to the commercial Lyon beak trimmer described in Patent No. 2,742,904. This device again consists of metal housing 1 containing a cauterizing coil 3 suspended therefrom. Electrically connected to the cauterizing unit is blade 9. The electrical connection 7 contains two leads 33 and 35. Lead 35 leads to rheostat connection 37 of rheostat 36, and lead 33 leads to the electrical connector bar 60. A wire 61 leads from the electrical connector bar 60 to cauterizer unit 3 and an additional lead, not shown, leads back to the electrical connector bar 60, and to the rheostat 36 to complete the circuit. The rheostat 36 is mounted on the underside of the housing cover and includes a control knob 40 exteriorly of the cover.

An anvil support 42 is pivotably mounted adjacent the rear of housing 1 by pivot pin 43. The anvil support is formed as an elongated channel member which terminates slightly beyond the blade 9. At a distance forwardly of the pivot pin 43 and at a lower horizontal level, a pivot pin 46 is mounted between the walls of the housing 1 for a trigger member 48, rockably mounted on pin 46. The trigger member 48 also forms a channel member of a width to fit between the flanges of the anvil support 42.

As is clearly shown in FIG. 4, helical spring 49 is secured at one end to flange of the anvil support 42 as at 50, the opposite end of the spring being secured to bolt 51 on the side wall of the housing 1. The tension of the spring draws the anvil support downwardly.

Figure 2:
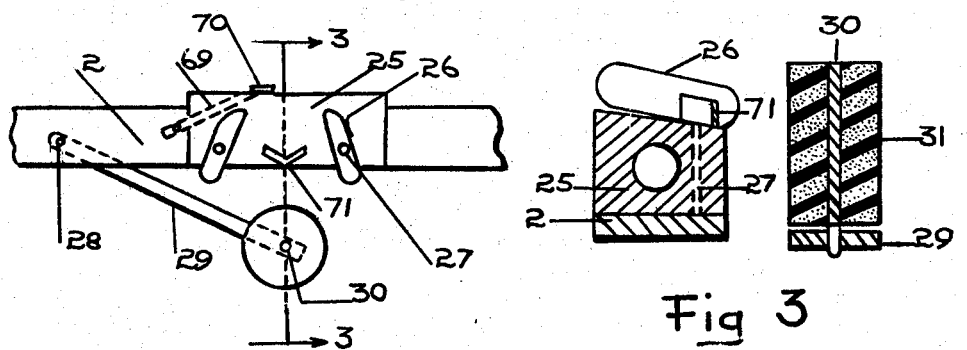
FIG. 2 is an enlarged plan view, illustrating the anvil and the tongue depressor and their relation to each other.
Figure 3:
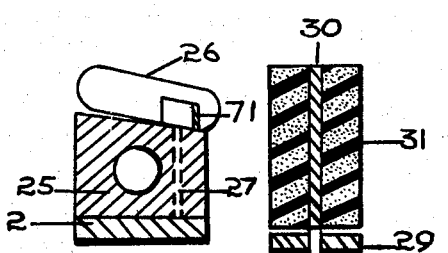
FIG. 3 is a sectional view, taken along lines 3—3 of FIG. 2, illustrating the construction of the anvil.

The trigger 48 has an eyelet 52 at its forward end for attachment of the connecting link 53 which passes through an opening 54 formed in the bottom wall of the housing 1. The lower end of the link 53 is pivotably connected to a foot pedal not shown. The link 29 for the vertical standard 30 of the tongue depressor 31 is pivoted at a point not shown on the anvil support 42. The anvil 25 is also located on the anvil support in alignment with the blade 9. As is shown in FIG. 2, there is a stop 70 pivotably connected by link 69 so as to be adjustable behind the anvil 25. This preferably is located to the left-hand side of the blade so as to limit the insertion of the lower beak into the cauterizing zone. Further, there is a divider 71 which conforms to the shape of the blade 9 and functions to prevent the chicken's beak from closing too securely around the tongue depressor 31. It has been found that since the tongue depressor is made of resilient material that the chicken's beak is apt to close unless provided with a cooled divider such as is illustrated in this figure. It will be noted also that the anvil is beveled slightly downwardly so as to compensate for the natural angle of the bird's beak. Thus, when the blade is brought into engagement with the beak, the beak is lying on its lateral side in an essentially level plane so that the cut is straight from side to side.

Figures 5, 6:
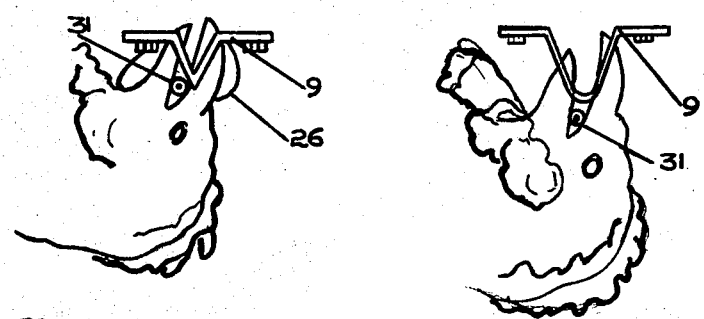
FIG. 5 is a diagrammatical view illustrating the relation of a bird's beak to the preferred blade of this invention.
FIG. 6 is a diagrammatical view illustrating a blade of a different configuration relative to a bird's beak.

While the blade 9 has been described as in the form of a V, it may be curved as is illustrated in FIG. 6 and still perform satisfactorily. In this embodiment, the curved blade has a narrow radius, so as to cut tangentially across the lower and upper beak from side to side according to my preferred method.

It will be appreciated that in the embodiments shown the means for bringing the anvil and the blade into engagement has been specified as being by manual pressure. However, it is within the scope of this invention to utilize electrical current to power the device through the use of a solenoid or the like, such as is disclosed in the patent to F. G. Hiester, No. 2,722,219. Further, it will be noted that it is immaterial whether the blade reciprocates vertically to meet the anvil or whether the anvil reciprocates or is rocked to come into engagement with the blade. The essence of this invention lies in the use of a tongue depressor which allows the bird's tongues to be held out of engagement with the blade so that the upper and lower beak can be severed and cauterized simultaneously. Further, the invention contemplates a novel placement of the bird's head and beak to allow for quick and simultaneous severing of both lower and upper beaks. It will be appreciated therefore, that the embodiments shown are meant to be illustrative in nature and should not be construed to limit the scope of this invention except as to be commensurate in scope with the appended claims.

I claim:
1. In a beak trimming device for trimming the beaks of birds including:
 (a) a blunt edge severing member;
 (b) means to heat said severing member to cauterizing temperatures;
 (c) an anvil, and;
 (d) means for bringing said severing member and said anvil into engagement;
the combination therewith of a tongue depressor mounted forwardly of said severing member and operative to depress the bird's tongue so that the upper and lower beaks can be severed simultaneously.

2. A beak trimming device as defined in claim 1 in which said severing member is bent so that the center portion projects forwardly of the side and end portions of said severing member to accomplish severing of the upper and lower beaks simultaneously at a tangential angle.

3. A beak trimming device, as defined in claim 1 in which said severing member is bent in the form of a V and in which the apex of the V projects forwardly of the legs of said V.

4. A beak trimming device, as defined in claim 3, in which the angle defined by the legs of the V is in the area of 45 degrees.

5. A beak trimming device, as defined in claim 2, the further combination of a divider conforming to the shape of said front portion of said severing member and mounted in proximity to the anvil so as to be in rubbing contact with the severing member as it comes into contact with the anvil.

6. A beak trimming device, as defined in claim 1, the further combination of a stop for the lower beak of said bird, said stop being located directly beyond the anvil and to the left so as to gauge the position of the beak on the anvil.

7. A beak trimming device as defined in claim 1, the further combination therewith of pivotable guides mounted laterally to the severing area of said anvil.

8. A beak trimming device as defined in claim 1 in which the severing member is bent in the form of an arc, having a narrow radius, the arc portion of the member projecting forwardly.

9. A beak trimming device as defined in claim 1 in which the tongue depressor is fabricated of resilient material and mounted on a standard so as to be pivotable in and out of the area of the severing member.

10. A process of trimming birds' beaks which comprises:
 (a) turning the bird's head 90 degrees, opening the bird's beak and placing the open beak over a tongue depressor to depress the tongue;
 (b) placing the lower and upper beak into a beak severing zone; and
 (c) applying a heated member at cauterizing temperatures to simultaneously trim and cauterize said upper and lower beaks from side to side.

References Cited
UNITED STATES PATENTS

| | | | |
|---|---|---|---|
| 2,359,569 | 10/1944 | Lyon | 128—303.1 |
| 2,722,219 | 11/1955 | Hiester | 128—305 |
| 2,742,904 | 4/1956 | Lyon | 128—303.1 |
| 2,766,756 | 10/1956 | Darrow et al. | 128—303.1 |

L. W. TRAPP, *Primary Examiner.*